March 18, 1969 S. T. RIBEIRO ET AL 3,433,554
ELECTRO-OPTICAL MODULATION OF RADIATION PATTERN
USING CURVED ELECTRODES
Filed May 1, 1964
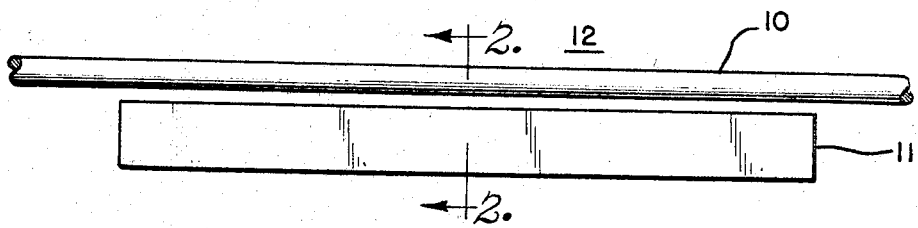
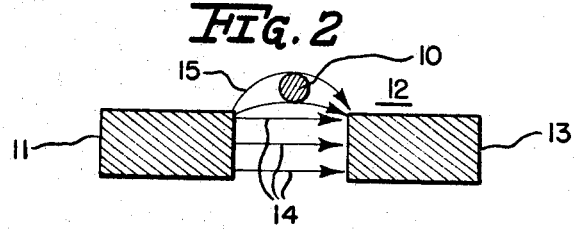
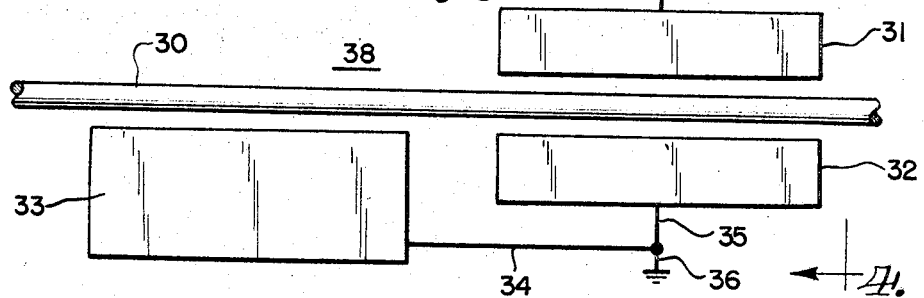
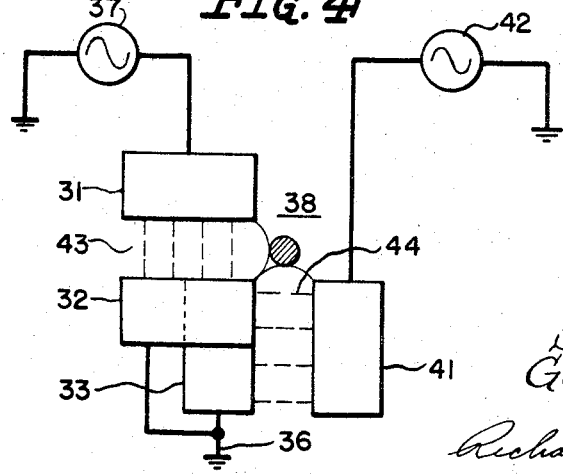
INVENTOR
Sergio T. Ribeiro
Gabor K. Ujhelyi
Richard J. Miller Atty.

INVENTORS
Sergio T. Ribeiro
Gabor K. Ujhelyi
BY Richard J. Miller
Atty.

United States Patent Office 3,433,554
Patented Mar. 18, 1969

3,433,554
ELECTRO-OPTICAL MODULATION OF RADIATION PATTERN USING CURVED ELECTRODES
Sergio T. Ribeiro and Gabor K. Ujhelyi, Urbana, Ill., assignors, by mesne assignments, to the United States of America as represented by the Secretary of the Navy
Filed May 1, 1964, Ser. No. 364,345
U.S. Cl. 350—160
Int. Cl. G02f 1/28
5 Claims

ABSTRACT OF THE DISCLOSURE

The invention disclosed herein deals primarily with a unique and novel system for deflecting coherent light beams and utilizes a particular configuration of electrodes, therein placement and structure to accomplish this end. It is primarily the unique distribution and control of the electrostatic fields that supply this control.

This invention relates to an electro-optical device and more specifically to a modulator for controlling the direction of a propagated light beam.

The current rate of growth of technology in the laser field has developed many new uses for light beams. However, the other devices for controlling the path of light, such as mirrors and prisms, are not in many instances adequate. For instance, the problem of directing light across vast reaches of space to a specific point might require alignment of elements beyond the state of the art. In such a case it may be necessary to cause a light beam to vary in direction so that it will sweep across such point. Oscillating mirrors or prisms are of limited utility in these applications on account of the large drive power required to overcome inertia.

It is therefore an object of this invention to provide means for varying the direction of a light beam.

It is further an object of this invention to control the direction of a projected light beam by controlling the index of refraction of a medium through which the beam passes.

It is yet another object to provide an electro-optical light modulator for a light beam comprising, liquid means having a variable index of refraction, means for directing the beam through a portion of the liquid means and means for applying electrostatic field across the portion of the liquid to vary the index of refraction of the liquid means in the light path.

Still a further object of this invention is to provide a light modulator for a light beam comprising a medium that is transparent to the wave length of the light beam and is birefringent, means for directing the beam through a portion of the medium, and means for applying an electrostatic field across a portion of the medium to vary the index of refraction of the medium in the light band.

A further object of the invention is to provided a light modulator having pairs of parallel, curved electrodes, having a light band therethrough, a medium in said light band being transparent to a given wave length of light and being birefringent, means for directing a light beam of said wave length along said band, and means for applying signals to said pairs of electrodes for varying the index of refraction along said path to vary the direction of the path of the light beam through said medium.

Other objects, advantages and novel features of the invention will become apparent from the following detailed description of the invention when considered in conjunction with the accompanying drawings wherein:

FIGURE 1 is a schematic view of one embodiment of the invention;

FIGURE 2 is a sectional view along lines 2—2 of FIGURE 1;

FIGURE 3 is a side view of a second embodiment of the invention;

FIGURE 4 is a view along lines 4—4 in FIGURE 3;

Figure 5:
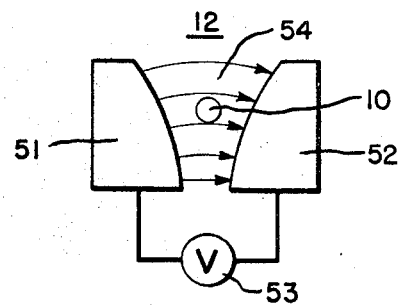
FIGURE 5 is an end view of another embodiment of this invention.

Referring now to the embodiment of the invention in FIGURES 1 and 2 there are shown electrodes 11, 13 immersed in a liquid 12 having a source of voltage connected thereacross. It is to be understood that the liquid is confined in some suitable container not shown for the sake of clarity. An electrostatic field represented by a series of lines 14 exists in the liquid between electrodes 11, 13 and is substantially uniform in the liquid immediately between the two electrodes. The portion 15 of the field that extends upwardly as shown in FIGURE 2, has a decreasing concentration of lines, hence, there is a graduated electrostatic field existing above the two electrodes. A beam of light 10 shown in solid lines in FIGURE 1 and as circular beam in FIGURE 2 is projected through the liquid, in this case a birefringent liquid such as nitrobenzene or carbon disulfide. When no electrostatic field exists, the beam 10 follows substantially a straight line, in this case traveling from left to right. As the field from source of potential, not shown, is applied, the effect is to change the index of refraction of the birefringent liquid 12 in the direction of the more concentrated electrostatic field and the beam 10 is along a second path. In the example shown beam 10 will be drawn downwardly as it progresses from left to right. It is to be understood that the degree of bending of the light path varies with the strength of field. Since the radius of curvature of the path of the light beam decreases as the gradient of the index of refraction increases, it is understood that, in a given device, the degree of bending of the light path varies with the strength of the applied electric field.

If an alternating signal is applied to the electrodes a periodic varying electrostatic field would exist therebetween and the beam 15 would be moved upwardly and downwardly in response to said signal. Thus, a method of modulating the direction of travel of a beam of light is provided.

FIGURES 3 and 4 show a second embodiment of the invention allowing for two dimensional control of a light beam. A first pair of parallel electrodes 31, 32 and a second pair of parallel electrodes 33, 41 are arranged at substantially right angles to each other. Electrodes 32, 33 are coupled by a pair of wires 34, 35 to a ground connection 36. A first signal source 37 is connected to electrode 31 and to ground, and a second signal source 42 is connected between electrode 41 and ground. A beam of light 30 is passed through a liquid 38 which completely surrounds electrodes 31, 32, 33, 41, and is confined within a suitable container not shown.

In operation of the device of FIGURES 3 and 4 signal source 37 causes the beam to move to right or left as shown in FIGURE 4, and source 42 causes the beam to move up and down. Thus, by properly combining the signals of 27 and 28 by well known means, the beam will be caused to move by double modulating its direction with the result being there is provided a highly versatile method of changing the direction of a light beam.

If the shape of the cross-section of the electrodes is not a certain curve, the shape of the cross-section of the beam will be modified as it travels through the deflective field. This effect is undesirable primarily because it tends to destroy the collimation of the beam. The condition can be avoided, however, by constructing the electrodes with the correct shape which can easily be calculated for a certain range of deflections. Thus, the beam cross-section can be maintained within a given, acceptable tolerance.

FIGURE 5 shows another embodiment of the invention somewhat similar to that of FIGURES 1 and 2 in that a pair of electrodes 51, 52 is positioned so that a light band exists therebetween along which the light beam 10 is propagated. The inter-electrode space 12 is filled with a medium which is both transparent to light of the frequencies of light beam 10, and birefringent. Thus, by placing a voltage source 53 across electrodes 51, 52 an electrostatic field 54 is established in the medium and the light beam 10 may be controlled and directed depending upon the characteristics of medium 12 with the shape of the beam's cross-section kept constant depending on the shape of the electrodes' cross-section.

Figure 6:
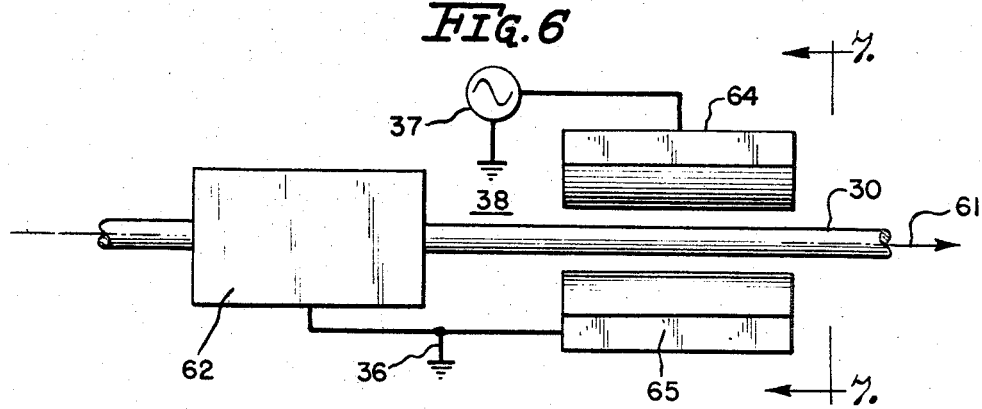
FIGURE 6 is a side view of still another embodiment of the invention.
Figure 7:
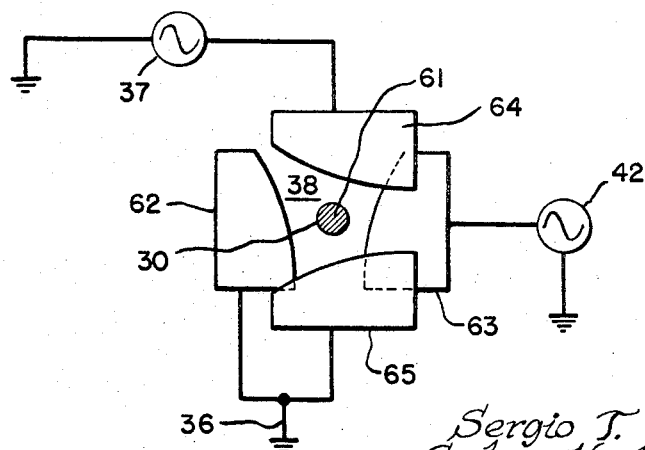
FIGURE 7 is a view along lines 7—7 in FIGURE 6.

FIGURES 6 and 7 show the curved electrodes being applied to the embodiment shown in FIGURES 3 and 4. In this instance the light beam 30 is directed along a light band 61 which is between a first pair of electrodes 62, 63 and a second pair of electrodes 64, 65. The inner faces of electrodes 62, 63 are curved to provide a tapered electrostatic field therebetween. Similarly, the inner electrode faces of electrodes 64, 65 are curved and application of signals by sources 37, 42 will vary the index of refraction of medium 38 by the respective pairs of electrodes and the direction of beam 30 will be varied depending upon the respective signals.

Obviously many modifications and variations of the present invention are possible in the light of the above teachings. It is therefore to be understood that within the scope of the appended claims the invention may be practiced otherwise than as specifically described.

We claim:
1. An electro-optical light modulator for electromagnetic waves in the optical spectrum, comprising:
    (a) first and second pairs of spaced electrodes parallel to each other respectively, and having respective first and second curved, inner faces extending therebetween and defining an interspace;
    (b) a birefringent medium with a variable index of refraction filling said space;
    (c) means for directing the electromagnetic wave in the optical spectrum through said medium; and
    (d) means for applying a voltage between said electrodes to vary the index of refraction of said medium said voltage creating an electrostatic field between said electrodes having curved lines of force and said electromagnetic wave directed through said curved lines.

2. An electro-optical light modulator for electromagnetic waves in the optical spectrum, comprising:
    (a) first and second electrodes parallel to each other and defining an interspace therebetween;
    (b) a birefringent medium with a variable index of refraction filling said interspace and surrounding said electrodes;
    (c) means coupled to said electrodes for establishing a variable voltage between said electrodes for establishing an electrostatic field therebetween, a portion of said field having straight lines of force and a portion having curved lines of force;
    (d) means for directing a coherent beam of electromagnetic wave energy in the optical spectrum through said medium in said portion of said curved lines of force, variation of said voltage varying said curved portion of said field and directing said beam in various directions.

3. The modulator of claim 2 wherein said beam is moved in a plane normal to said portion of said field having straight lines of force.

4. The modulator of claim 3 wherein a second pair of electrodes are positioned to move said beam in a second plane not parallel to said first plane.

5. The modulator of claim 2 wherein at least one of said electrodes has a portion curved to provide a curved portion of said field between said electrodes.

References Cited

UNITED STATES PATENTS

| | | | |
|---|---|---|---|
| 2,915,943 | 12/1959 | Brown et al. | 350—160 |
| 3,339,151 | 8/1967 | Smith | 331—94.5 |
| 2,163,549 | 6/1939 | Clothier et al. | 350—150 |
| 2,163,551 | 6/1939 | Clothier et al. | 350—150 |
| 2,836,652 | 5/1958 | Sprague | 350—160 |

JEWELL H. PEDERSEN, *Primary Examiner.*

RONALD L. WIBERT, *Assistant Examiner.*